O. M. WOLFF.
MEAT COMPRESSER.
APPLICATION FILED DEC. 15, 1919.
1,388,082.
Patented Aug. 16, 1921.
2 SHEETS—SHEET 2.
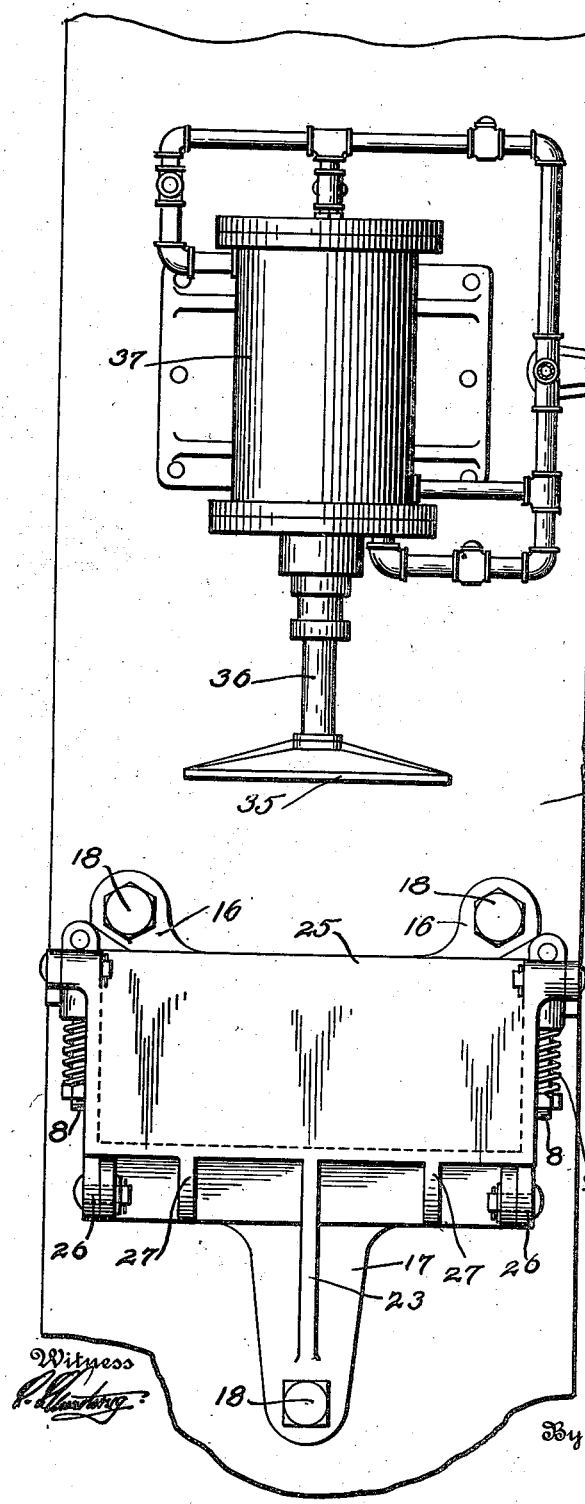
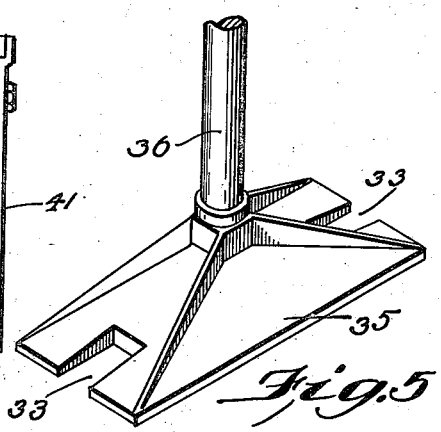
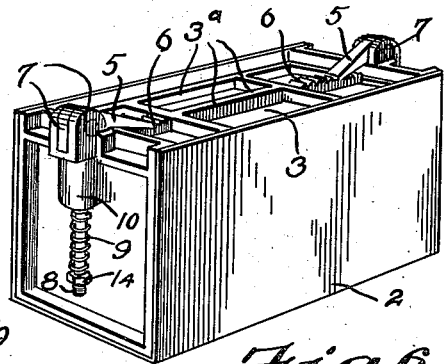
Inventor
Oscar M. Wolff
By Eugene E. Brown
Attorney

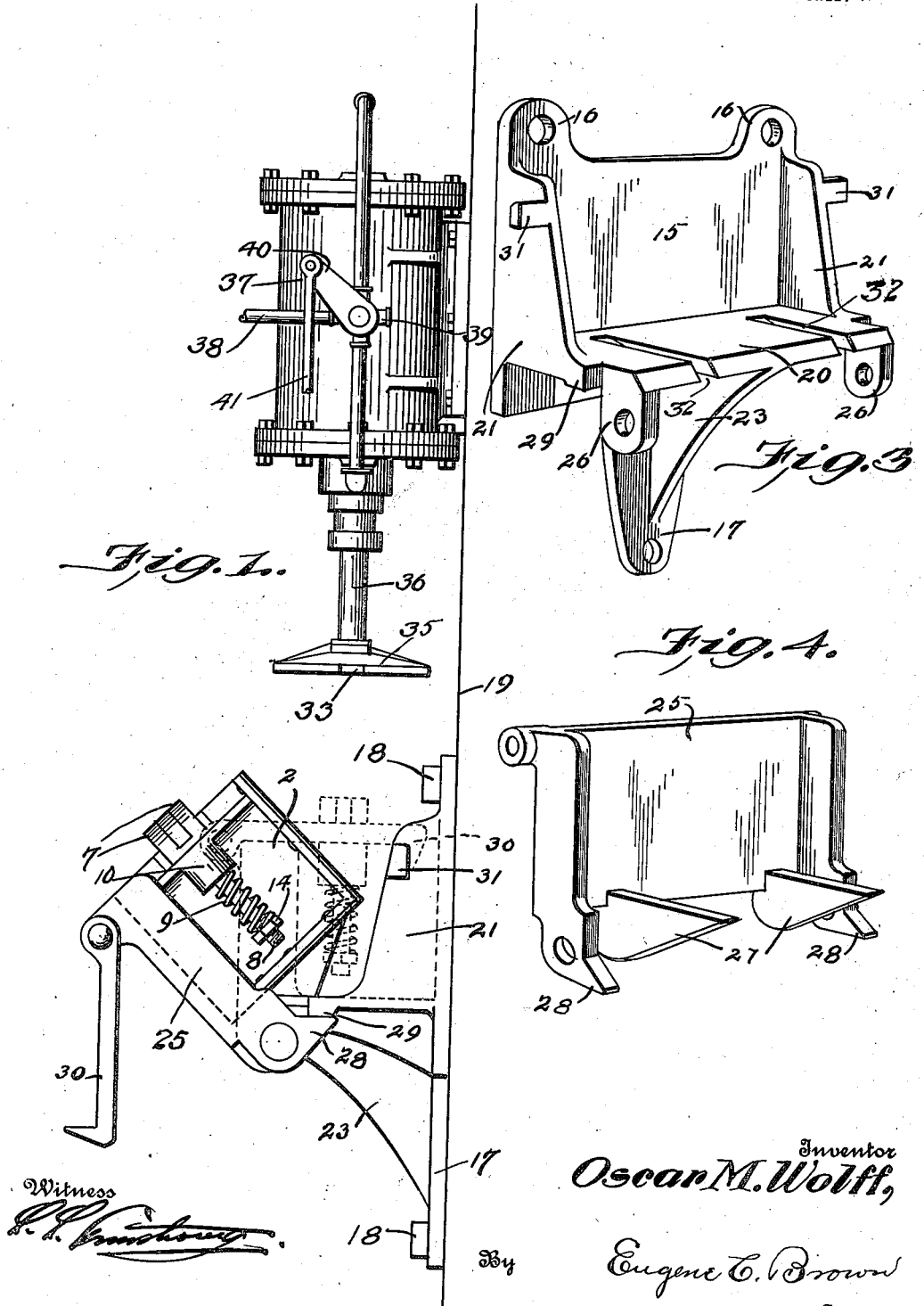

UNITED STATES PATENT OFFICE.

OSCAR M. WOLFF, OF CHICAGO, ILLINOIS, ASSIGNOR TO B. B. HANAK COMPANY, OF CHICAGO, ILLINOIS, A CORPORATION OF ILLINOIS.

MEAT-COMPRESSER.

1,388,082.    Specification of Letters Patent.    Patented Aug. 16, 1921.

Application filed December 15, 1919. Serial No. 345,108.

*To all whom it may concern:*

Be it known that I, OSCAR M. WOLFF, a citizen of the United States, residing at Chicago, in the county of Cook and State of Illinois, have invented certain new and useful Improvements in Meat - Compressers, of which the following is a specification.

This invention relates to mechanism for compressing uncooked meat and particularly boned hams which are held under compression in molds during the cooking operation.

At the present time there is a demand for cooked hams and other meat of rectangular form so that it may be readily cut into attractive thin slices by machines now in common use. Furthermore, all waste is practically eliminated in hams which have been subjected to sufficient pressure to re-distribute the fatty portions and cause the natural irregular form to conform to the rectangular walls of the mold.

The object of my invention is to provide a compressing mechanism which will facilitate the rapid handling of the metallic receptacles or molds in which the compression is effected and which is compact and easily operated.

In the following description I shall refer to the accompanying drawings in which—Figures 1 and 2 are side and front elevations respectively of a compresser embodying my invention; Fig. 3 is a perspective view of the supporting bracket for the molds; Fig. 4 is a perspective view of the pivoted side member of the mold support; Fig. 5 is a perspective view of the pressure plate of the power-press; and Fig. 6 is a perspective view of the meat mold and cooker.

The meat mold or receptacle in which the ham is compressed and held under pressure during the cooking operation is shown in Fig. 6 and is claimed in my application, Serial No. 344,438. This mold consists of a rectangular metal box or receptacle 2 having a slidable cover 3, which is forced down upon the meat with the desired pressure and is retained by the pawls 5 engaging the racks 6 on the cover. The pawls are pivotally mounted between ears 7 on the upper ends of the bolts 8 which pass through apertures in the lugs 10 and are yieldingly held by the helical springs 9. The tension on the springs may be adjusted by means of the nuts 14 to maintain the desired pressure on the meat when the receptacle or mold box is removed from the press.

The bed of the press which holds the mold box during the compressing operation is in the form of a bracket 15, provided with ears 16 and 17 for the bolts 18 which secure it to the wall or standard 19 or other suitable support. The shelf 25 is braced at the sides by web flanges 21, and at the center by a brace-web 23.

To facilitate the insertion and removal of the mold box from the press I provide the swinging side plate 25, which is pivoted to the lugs 26, with lugs 27 perpendicular to the plate, to hold the box when the plate is swung outwardly into the position shown in Fig. 1, where it is held by the lugs 28, which engage the stops 29 on the bottom of the shelf. In this tilted position of the side plate the mold box can be readily slid down the inclined plate until it rests against the lugs 27. The side plate is then swung upwardly into vertical position, indicated in dotted lines in Fig. 1, and secured by throwing the hooks 30 over the lugs 31 projecting from the flanges 21. The shelf 20 is slotted at 32 to permit the lugs 27 to pass, the upper edges being flush with the top of the shelf when in closed position.

The construction above described provides an exceedingly rigid structure to resist the downward pressure or thrust of the compresser. The ends of the shelf are braced by the end webs 21 and the center is reinforced by the brace 23.

The pressure foot or plate 35 of the compresser is secured to the lower end of the piston or plunger rod 36 of any suitable pressure cylinder 37 which may be actuated by steam, compressed air or hydraulic pressure. It is obvious also that an electrically operated press may be employed. I have illustrated in a conventional manner, a pressure cylinder connected to a source of fluid pressure by pipe 38, the pressure to either end of the cylinder and the connection of the exhaust 39 to the other end being controlled in the usual manner by a valve having its lever 40 connected to the manual or foot lever by the rod 41.

When the power cylinder is actuated the pressure foot plate 35 bears upon the upstanding ribs 3ª, the plate being provided with notches 33 to pass over the pawls 5 and rack bars 6.

The operation of my meat compresser will be understood from the foregoing detailed description of the structure. After the boned ham has been placed in the mold box shown in Fig. 6, the side plate 25 of the compresser base is swung outwardly and the box is slid into place as indicated in Fig. 1. The side plate or swinging receiving member is then swung into vertical position and secured by throwing the latch 30 over the lug 31. This is merely a precautionary measure, as the weight of the box would hold the parts in closed position without the use of a latch. The lever connected with the rod 41 is actuated to throw the valve into a position to connect the fluid pressure with the upper end of the cylinder 37, thereby causing the pressure plate 35 to descend and bear upon the cover 3 until the meat has been compressed to the desired amount. The valve is then reversed to connect the upper end of the cylinder with the exhaust and the lower end with the fluid pressure pipe 38, thus causing the pressure plate to be retracted. During the compression, the pawls 5 slip over the racks 6 from one tooth to another as the cover descends and when the pressure is removed the cover is held down by the pawls, the springs 9 having been adjusted to maintain the desired predetermined tension.

After the compression the side member 25 is again swung outwardly into the position indicated in Fig. 1 and the mold box is removed and placed in the cooking oven.

It will be obvious to engineers that various changes and modifications may be made in the construction described without in any manner departing from the invention.

I claim:—

1. A meat compresser, comprising a bracket support for a mold box or receptacle having a side member pivotally mounted to swing outwardly and provided with stops to hold it in an inclined position to facilitate the insertion and removal of the mold.

2. A meat compresser, comprising a bracket support for a mold box or receptacle having a side member pivotally mounted to swing outwardly and provided with lugs to support the bottom of the mold as the side member is being swung into closed position.

3. A meat compresser, comprising a support for a mold box, having a shelf upon which the box rests during the compression, a side member pivotally mounted to swing outwardly to facilitate the insertion of the box, said member being provided with lugs to support the bottom of the box as it is swung with the side member into vertical position, the shelf being provided with slots or apertures to receive said lugs.

4. A meat compresser as set forth in claim 3 and the side member being constructed to engage a part of the support to maintain it in inclined position when swung outwardly to facilitate the insertion and withdrawal of the mold box.

5. A meat compresser comprising the supporting mechanism set forth in claim 3 in combination with means for applying pressure to the mold box when in operative position on the shelf of the support.

In testimony whereof I affix my signature.

OSCAR M. WOLFF.